US012732537B2

(12) United States Patent
Septon et al.

(10) Patent No.: US 12,732,537 B2
(45) Date of Patent: Sep. 8, 2026

(54) ENHANCING SECURITY OF QUANTUM COMMUNICATION CHANNELS

(71) Applicants: Mellanox Technologies, Ltd., Yokneam (IL); Bar-Ilan University, Ramat Gan (IL)

(72) Inventors: Tali Septon, Haifa (IL); Elad Mentovich, Tel Aviv (IL); Moshe B Oron, Rehovot (IL); Yonatan Piasetzky, Tel Aviv (IL); Yuval Idan, Rishon LeTsiyon (IL); Eliahu Cohen, Rehovot (IL); Avshalom C Elitzur, Zavdiel (IL); Taylor Lee Patti, Orange, CA (US)

(73) Assignees: BAR-ILAN UNIVERSITY, Ramat Gan (IL); MELLANOX TECHNOLOGIES, LTD., Yokneam (IL)

( * ) Notice: Subject to any disclaimer, the term of this patent is extended or adjusted under 35 U.S.C. 154(b) by 59 days.

(21) Appl. No.: 18/221,007

(22) Filed: Jul. 12, 2023

(65) Prior Publication Data

US 2024/0195834 A1 Jun. 13, 2024

(30) Foreign Application Priority Data

Dec. 8, 2022 (IL) ........................................ 298937

(51) Int. Cl.
*G06F 15/16* (2006.01)
*G06F 9/54* (2006.01)
(Continued)

(52) U.S. Cl.
CPC ......... *H04L 63/1475* (2013.01); *H04B 10/70* (2013.01); *H04L 63/1416* (2013.01)

(58) Field of Classification Search
CPC .. H04L 63/1475; H04L 63/1416; H04B 10/70
(Continued)

(56) References Cited

U.S. PATENT DOCUMENTS 6,741,374 B2 5/2004 Pittman
7,881,473 B2 2/2011 Wang
(Continued)

FOREIGN PATENT DOCUMENTS

WO WO-2021155903 A1 * 8/2021 .......... H04W 12/106

OTHER PUBLICATIONS

Avron, J. et al., "Quantum advantage and noise reduction in distributed quantum computing," Physical Review A., Aug. 23, 2021, 104.5: p. 052404.
(Continued)

*Primary Examiner* — Hamza N Algibhah
(74) *Attorney, Agent, or Firm* — Alston & Bird LLP

(57) ABSTRACT

Methods, apparatus, and computer program products for quantum communications and quantum information processing are provided. An example method includes determining a received state of a qubit received via a quantum communication link where the received state includes one or more properties of the received qubit. The method further accesses a transmitted state of the qubit where the transmitted state includes one or more properties of the qubit as transmitted. The method continues by comparing the one or more properties of the qubit in the received state with the one or more properties of the qubit in the transmitted state. Finally, the method detects a condition of the quantum communication link based on the comparison between the received state and the transmitted state. In doing so, the embodiments operate to characterize the noise level, security, etc. of a quantum communication interconnect, link, or channel.

26 Claims, 6 Drawing Sheets

(51) Int. Cl.
*H04B 10/70* (2013.01)
*H04L 9/40* (2022.01)
*H04L 29/06* (2006.01)

(58) Field of Classification Search
USPC .......................................................... 726/23
See application file for complete search history.

(56) References Cited

U.S. PATENT DOCUMENTS 8,369,710 B2 2/2013 Thiele
8,433,070 B2 4/2013 Habif
9,077,577 B1 7/2015 Ashrafi
9,306,739 B1 * 4/2016 Troupe ................. H04L 9/0858
9,356,780 B2 5/2016 Tanizawa
9,692,523 B2 6/2017 Smith
9,876,639 B2 1/2018 Choi
10,594,408 B2 3/2020 Bishop
10,855,457 B1 12/2020 Vakili
10,862,677 B2 12/2020 Bitauld
10,992,391 B1 * 4/2021 Meyers .............. H04B 10/0799
11,163,535 B1 11/2021 Vakili
11,240,013 B1 2/2022 Vakili
11,309,970 B2 4/2022 Woodward
11,343,270 B1 5/2022 Carter, Jr.
11,405,115 B2 8/2022 Gimeno-Segovia
11,411,658 B1 * 8/2022 Vacon .................... H04B 10/70
11,444,636 B2 9/2022 Lucarelli
11,451,308 B1 9/2022 Bucklew
11,483,144 B1 10/2022 Vakili
11,664,983 B2 5/2023 Mentovich
11,689,223 B2 6/2023 Aspuru-Guzik et al.
12,166,867 B1 * 12/2024 Wang .................... H04L 9/0819
12,278,666 B2 * 4/2025 Vacon .................... G06N 10/40
2002/0067882 A1 6/2002 Guilfoyle
2002/0106084 A1 * 8/2002 Azuma ................. H04L 9/0852 380/263
2003/0118282 A1 6/2003 Tatum
2004/0013437 A1 1/2004 Wiltsey
2004/0037496 A1 2/2004 Pierce
2004/0126072 A1 7/2004 Hoon Lee
2004/0202218 A1 10/2004 Thornton
2005/0078826 A1 4/2005 Takeuchi
2005/0152540 A1 7/2005 Barbosa
2006/0013396 A1 1/2006 Kollmitzer
2006/0245762 A1 11/2006 Thiele
2008/0137858 A1 6/2008 Gelfond
2008/0165957 A1 7/2008 Kandasamy
2008/0175385 A1 7/2008 Lee
2008/0292095 A1 11/2008 Vig
2008/0292102 A1 11/2008 Wang
2009/0070402 A1 3/2009 Rose
2009/0180615 A1 7/2009 Trifonov
2010/0150222 A1 * 6/2010 Meyers .................. H04B 10/70 375/240
2011/0129225 A1 6/2011 Gostin
2011/0142242 A1 6/2011 Tanaka
2011/0150502 A1 6/2011 Zhao
2012/0177201 A1 7/2012 Ayling
2012/0314863 A1 * 12/2012 Troupe .................. H04B 10/70 380/256
2013/0101119 A1 4/2013 Nordholt
2016/0021394 A1 1/2016 Watson
2016/0218867 A1 7/2016 Nordholt
2016/0234018 A1 8/2016 Frohlich et al.
2017/0040772 A1 2/2017 Raz
2017/0163415 A1 6/2017 Gray et al.
2017/0214525 A1 7/2017 Zhao
2017/0344898 A1 11/2017 Karimi
2018/0069631 A1 3/2018 Ashrafi
2018/0069698 A1 * 3/2018 Hong ...................... H04L 9/083
2018/0145753 A1 5/2018 Ashrafi et al.
2018/0365585 A1 12/2018 Smith
2019/0123847 A1 4/2019 Bush
2019/0379463 A1 12/2019 Shields
2020/0044836 A1 2/2020 Kim
2020/0274703 A1 * 8/2020 Lukens ................. H04L 9/0858
2021/0083864 A1 3/2021 Bush
2021/0105135 A1 4/2021 Figueroa
2021/0152346 A1 * 5/2021 Bucklew ................ H04B 10/66
2021/0152347 A1 5/2021 Cambou
2021/0174237 A1 6/2021 Mentovich
2021/0231879 A1 7/2021 Mathai
2021/0342161 A1 11/2021 Lauer
2022/0006627 A1 1/2022 Ko
2022/0070221 A1 3/2022 Labudde et al.
2022/0209942 A1 6/2022 Mentovich
2022/0209943 A1 6/2022 Syrivelis
2022/0214713 A1 * 7/2022 Vacon ................... G06N 10/70
2022/0224996 A1 7/2022 Nickerson
2022/0245496 A1 8/2022 Singh
2022/0400001 A1 * 12/2022 Catuogno ............ H04L 9/0819
2023/0039262 A1 * 2/2023 Mantelet ............. H04L 63/1475
2023/0058053 A1 * 2/2023 Hunt ..................... H04L 9/3271
2023/0059433 A1 2/2023 Lecocq
2023/0132571 A1 5/2023 Bakopoulos
2023/0188544 A1 * 6/2023 Hunt ..................... H04L 9/0852 726/23
2023/0217136 A1 * 7/2023 Van Der Tempel ......................... H04N 25/773 250/378
2023/0246826 A1 8/2023 Van Vredendaal et al.
2023/0327861 A1 * 10/2023 White .................... H04B 10/70 713/171
2023/0370255 A1 11/2023 Fehenberger et al.
2024/0195834 A1 * 6/2024 Septon ................ H04L 63/1475
2024/0275494 A1 * 8/2024 Spiropulu ............. G06N 10/40
2024/0405886 A1 * 12/2024 Vacon .................... G06N 10/40
2024/0419404 A1 * 12/2024 Burchard ............... H04B 10/70
2025/0044093 A1 * 2/2025 Genevrier ............... G06T 7/521

OTHER PUBLICATIONS

Beals, R. et al., "Efficient Distributed Quantum Computing," Proceedings of the Royal Society A: Mathematical, Physical and Engineering Sciences, Nov. 19, 2012, 469, No. 2153: p. 20120686.

"Bidirectional (BiDi) WDM Transceivers," Jun. 1, 2021 [online]. Retrieved from the internet: <https://community.fs.com/blog/a-brief-introduction-of-bidi-sfp-transceiver.html>.

Chen, W. et al., "A Novel Picoseconds Optical Pulse Source for Free-Space Decoy-State Quantum Key Distribution," 2013 IEEE Nuclear Science Symposium and Medical Imaging Conference. pp. 1-4.

Cochran, R. et al., "Qubit-Based Clock Synchronization for QKD Systems Using a Bayesian Approach," Entropy 2021, 23.8, p. 988. <https://doi.org/10.3390/e23080988>.

Diadamo, S. et al., "Distributed Quantum Computing and Network Control for Accelerated VQE," Quantum Physics Systems and Control. IEEE Transactions on Quantum Engineering 2021. pp 1-21. <https://doi.org/10.1109/TQE.2021.3057908>.

Takahashi, Dean, "Twitch cofounder Justin Kan is back with NFT gaming market place Fractal," Gamesbeat, (Dec. 2021), <https://venturebeat.com/2021/12/13/twitch-cofounder-justin-kan-is-back-with-nft-gaming-marketplace-fractal/>.

Vest, G. et al., "Design and Evaluation of a Handheld Quantum Key Distribution Sender module," 2014, IEEE Journal of Selected topics in Quantum Electronics, vol. 21, No. 3, pp. 1-7.

Wengerowsky, S. et al. "An entanglement-based wavelength-multiplexed quantum communication network," Nature 564, pp. 225-228, Dec. 12, 2018 [online]. Retrieved from the Internet: <https://doi.org/10.1038/s41586-018-0766-y>.

Humble, T. et al., "Quantum Computers for High-Performance Computing," IEEE Micro, 41.5 (2021): pp. 15-23.

Jiang, N. et al., "Secure key distribution applications of chaotic lasers," 2016, Proc. of SPIE vol. 10026, pp. 1-8.

Kass, Michael, LinkedIn post entitled "Plumbing the Metaverse with USD," (Mar. 2021), <https://www.linkedin.com/pulse/plumbing-metaverse-usd-michael-kass/trackingld=y2PXzhkR76bnLEoMzY2ilw%3D%3D>.

(56) References Cited

OTHER PUBLICATIONS

Kim, J. et al., "Technology-Driven, Highly-Scalable Dragonfly Topology," IEEE, 2008 International Symposium on Computer Architecture, 2008, pp. 77-88.
Lambert, R. et al., "Quantum-classical path integral. I. Classical memory and quantum nonlocality," The Journal of Chemical Physics, vol. 137, pp. 1-10, 2012.
Liu, Xu et al., "An entanglement-based quantum network based on symmetric dispersive optics quantum key distribution," APL Photonics 5, 076104, Jul. 8, 2020 [online]. Retrieved from the Internet: <https://doi.org/10.1063/5.0002595>.
Mellette, W. et al., "Expanding across time to deliver bandwidth efficiency and low latency," 17th USENIX Symposium on Networked Systems Design and Implementation, Feb. 2020, 19 pages.
Navarrete, Glynis, "What is a PCIe Switch?," 2021.
Preskill, J., "Quantum Computing in the NISQ era and beyond," Institute for Quantum Information and Matter and Walter Burke Institute for Theoretical Physics, California Institute of Technology, Pasadena CA 91125, arXiv: 1801.00862v3, Jul. 31, 2018, <https://doi.org/10.22331/q-2018-8-6-79>.
Zahringer, F. et al., "Realization of a Quantum Walk with One and Two Trapped Ions," Phys. Rev. Lett. 104, 100503, Mar. 9, 2010, <https://journals.aps.org/prl/abstract/10.1103/PhysRevLett.104.100503>.
Shor, P., "Algorithms for Quantum Computation: Discrete Logarithms and Factoring," Proceedings of the 35th Annual Symposium on Foundations of Computer Science, pp. 124-134, Nov. 20-22, 1994.
Singh, S. et al., "Universal quantum computing using single-particle discrete-time quantum walk," Sci Rep 11, 11551 (2021), <https://doi.org/10.1038/s41598-021-91033-5>.
Tessinari, R. et al., "Field trial of dynamic DV-QKD networking in the SDN controlled fully meshed optical metro network of the Bristol city 5GUK test network," ECOC2019, Dublin Ireland, 4 pages.
Venegas-Andraca, S.E., "Quantum walks: a comprehensive review," Quantum Inf Process 11.5, pp. 1015-1106 (2012), <https://doi.org/10.1007/s11128-012-0432-5>.
Bakopoulos, P. et al., Pending U.S. Appl. No. 17/686,475, filed Mar. 4, 2022.
Ganju, S. et al., Pending U.S. Appl. No. 18/091,214, filed Dec. 29, 2022.
Seifoory, H. et al., Pending U.S. Appl. No. 18/108,145, filed Feb. 10, 2023.
Septon, T. et al., Pending U.S. Appl. No. 18/220,990, filed Jul. 12, 2023.
Seifoory, H. et al., Pending U.S. Appl. No. 18/137,737, filed Apr. 21, 2023.
Septon, T. et al., Pending U.S. Appl. No. 18/123,555, filed Mar. 20, 2023.
Septon, T. et al., Pending U.S. Appl. No. 17/878,464, filed Aug. 1, 2022.
Mentovich, E. et al., Pending U.S. Appl. No. 17/828,854, filed May 31, 2022.
Ganju, S. et al., Pending U.S. Appl. No. 17/863,779, filed Jul. 13, 2022.
Scheps, K. et al., Pending U.S. Appl. No. 17/660,349, filed Apr. 22, 2022.
Vegas Olmos, J. et al., Pending U.S. Appl. No. 17/675,669, filed Feb. 18, 2022.
Mentovich, E. et al., Pending U.S. Appl. No. 18/137,755, filed Apr. 21, 2023.
Seifoory, H. et al., Pending U.S. Appl. No. 18/137,758, filed Apr. 21, 2023.
Mentovich, E. et al., Pending U.S. Appl. No. 18/135,954, filed Apr. 18, 2023.

* cited by examiner

100
QUANTUM COMMUNICATION LINK 102
QUANTUM COMMUNICATION RECEIVER 108
QUANTUM CHANNEL EAVESDROPPER 110
COMMUNICATION NETWORK(S) 104
QUANTUM COMMUNICATION TRANSMITTER 106

ENHANCING SECURITY OF QUANTUM COMMUNICATION CHANNELS

CROSS-REFERENCE TO RELATED APPLICATIONS

This application claims priority to Israel Patent Application No. 298937, filed Dec. 8, 2022, the entire contents of which application are hereby incorporated herein by reference.

TECHNOLOGICAL FIELD

Example embodiments of the present disclosure relate generally to quantum information processing and, more particularly, to techniques for characterizing quantum communication links, quantum communication channels, quantum computation circuits, and the like in the context of quantum cryptography, quantum computation, or otherwise.

BACKGROUND

Communication networks, systems, channels, and the like are employed in a variety of applications in order to transmit data from one location to another. In order to prevent outside actors, such as an eavesdropper, from obtaining or accessing information of these private communications, various cryptographic techniques may be employed. For example, communication systems may attempt to secure information by leveraging quantum keys distributed between the parties prior to the communication (e.g., via a quantum communication link or otherwise). Through applied effort, ingenuity, and innovation, many of these problems have been solved by developing solutions that are included in embodiments of the present disclosure, many examples of which are described in detail herein.

BRIEF SUMMARY

To address these problems and others, various embodiments of the present disclosure provide techniques for communicating on a quantum communication channel that allow a quantum communication device and/or characterization device to determine the condition (e.g., secure, unsecure, noisy, etc.) and/or a number of quantum errors of the quantum communication link based upon the characteristics (e.g., quantum state or the like) associated with the qubits transmitted via the link. In some particular implementations, this state determination may include the detection of an eavesdropper accessing the quantum communication link utilizing weak measurement techniques. With reference to an example method for communicating on a quantum communication channel, the method may include determining a received state of a qubit received via the quantum communication link (e.g., previously transmitted via the link) where the received state comprises one or more properties of the received qubit. The method may further include determining a received encoded value based at least in part on the one or more properties (e.g., quantum properties, physical properties, observables, and/or degrees of freedom (e.g., qubit state)) of the received qubit. In addition, the method may include accessing a state of the qubit, where the transmitted state includes one or more one or more properties (e.g., quantum properties, physical properties, observables, and/or degrees of freedom (e.g., qubit state)) of the transmitted qubit. The method may further include comparing the one or more properties of the received qubit and/or the received qubit state with the one or more properties of the transmitted qubit and/or the transmitted qubit state and detecting a condition of the quantum communication link based on the comparison between the transmitted and received states.

In some embodiments, the method may further include analyzing quantum correlations between two (2) or more qubits (e.g., entangled qubits) transmitted using the quantum communication link.

In some embodiments, the method may further include detecting an eavesdropper device accessing the quantum communication link based on the comparison between the received and the transmitted qubit states.

In some further embodiments, the eavesdropper device accessing the quantum communication link may utilize weak measurements thus leaving a weaker trace that is more challenging to detect.

In some embodiments, the qubit or qudit (e.g., quantum system, quantum information unit, et.) may be physically realized using one or more photons.

In some embodiments, the one or more properties (e.g., quantum properties, physical properties, observables, and/or degrees of freedom (e.g., qubit state) of the received state of the qubit may include at least a polarization value (e.g., angle) associated with the received qubit. Further, the one or more properties of the qubit's transmitted state may include at least the polarization of the qubit as transmitted. In these embodiments, detecting the condition of the quantum communication link may further include measuring the polarization of the received qubit according to some measurement basis and comparing outcome with the polarization associated with the qubit (e.g., of the photon) in the transmitted state according to the basis of preparation.

In some embodiments, the one or more properties of the received state of the qubit may include at least a position value of the received qubit including superposition. Further, the one or more properties of the transmitted state of the qubit as transmitted may comprise at least a position associated with the qubit as transmitted including superposition. In these embodiments, detecting the condition of the quantum communication link may further include measuring the position value associated with the qubit in the received state and comparing the position value associated with the qubit in the received state with the position value associated with the qubit in the transmitted state.

In some embodiments, measuring the position associated with the qubit may further include measuring a spatial location of the received state of the qubit.

In some embodiments, the spatial location of the received state of the qubit may be measured using an imaging device.

In some embodiments, detecting a condition of the quantum communication link may further include determining a first spatial location associated with the received state of the qubit, accessing a second spatial location associated with the transmitted state of the qubit, determining a displacement between the first and the second spatial locations, and detecting the condition of the quantum communication link based on the displacement between the first and the second spatial locations.

In some embodiments, the received encoded value may represent a qubit, and each qubit may be communicated by the transmission of a single photon.

In some embodiments, measuring the position value associated with the qubit may include measuring a time of arrival of the received state of the qubit.

In some further embodiments, detecting a condition of the quantum communication link may further include determining a time of arrival associated with the received state of the qubit, accessing a time of transmittal associated with the transmitted state of the qubit, determining a travel time between the time of transmittal and the time of arrival, and detecting the condition of the quantum communication link based on the travel time for the qubit.

In some embodiments, a plurality of qubits may be received, and each qubit of the plurality may include a single photon of an entangled pair or other multipartite state.

In some embodiments, the method may further include transmitting a subset of the received plurality of qubits to a transmit module associated with the qubit's transmitted state.

In some embodiments, a plurality of qubit may be received each having a transmitted encoded value according to a transmitted basis vector. In such embodiments, the method may further include comparing the received encoded value with the transmitted encoded value from a subset of the received qubits and detecting the condition of the quantum communication link based on the comparison between the subset of received encoded values and transmitted encoded values. In some of these embodiments, the subset of the received qubits may include some received encoded values wherein the determined basis vector matches the transmitted basis vector, and some received encoded values where the determined basis vector fails to match the transmitted basis vector.

The above summary is provided merely for summarizing some example embodiments to provide a basic understanding of some aspects of the present disclosure. Accordingly, it should be appreciated that the above-described embodiments are merely examples and should not be construed to narrow the scope or spirit of the disclosure in any way. It will be appreciated that the scope of the present disclosure encompasses many potential embodiments in addition to those here summarized, some of which are further described below.

BRIEF DESCRIPTION OF THE DRAWINGS

Having thus described certain example embodiments in general terms, reference will now be made to the accompanying drawings. The components illustrated in the figures may or may not be present in certain embodiments described herein. Some embodiments may include fewer (or more) components than those shown in the figures.

Figure 1:
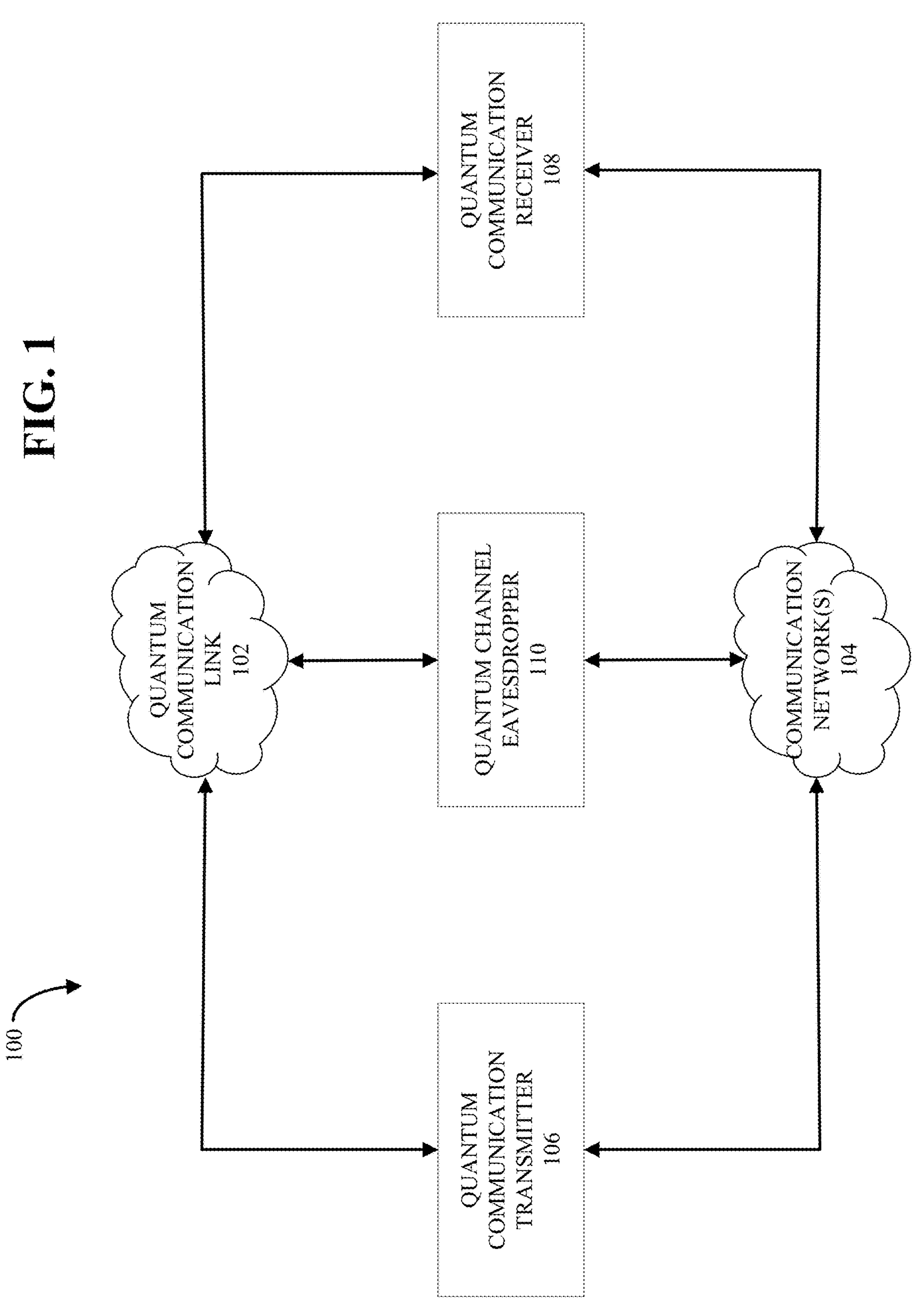

FIG. 1 illustrates an example quantum communication system including an eavesdropper device in accordance with one or more embodiments.

Figure 2:
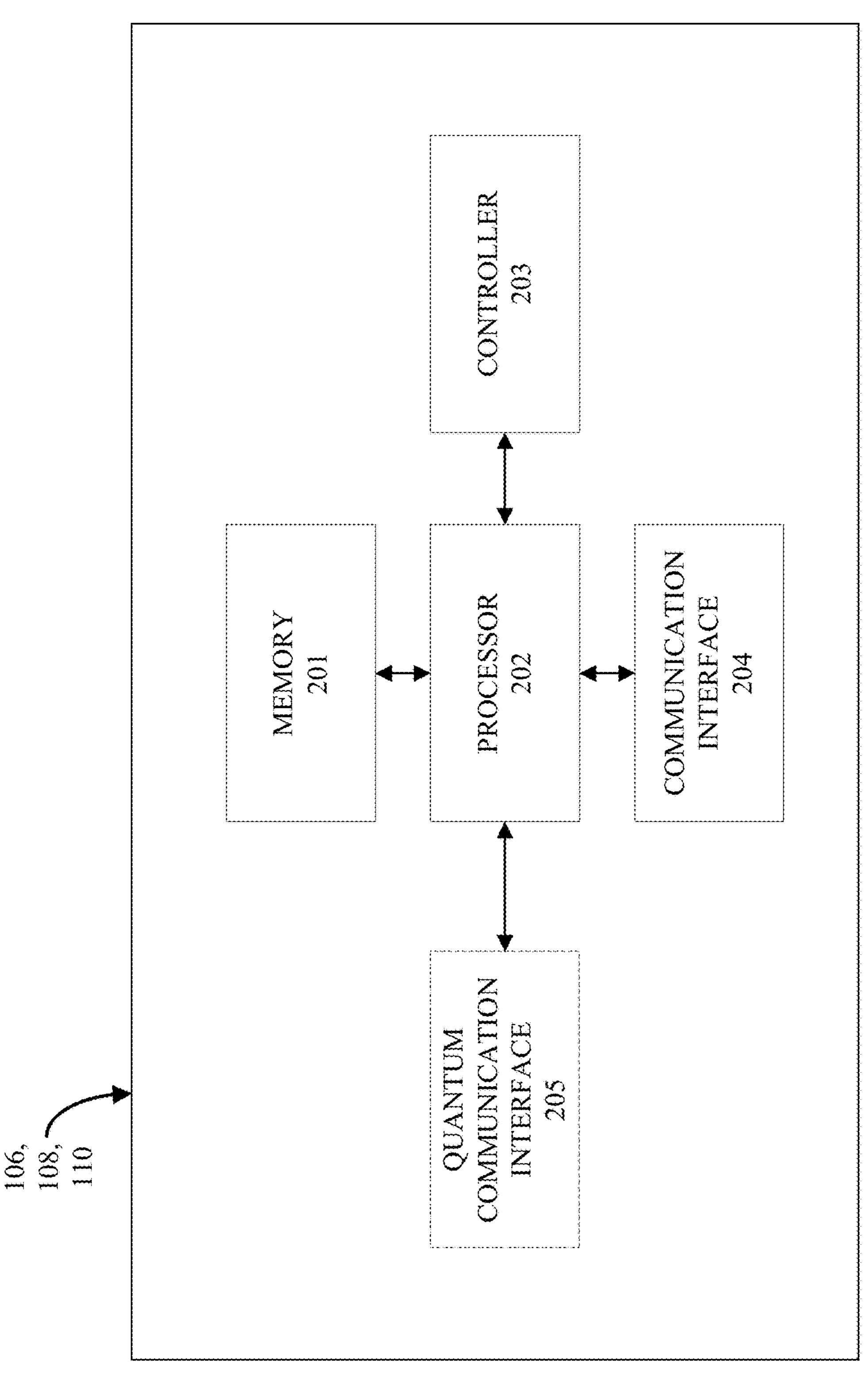

FIG. 2 illustrates an example quantum communication device in accordance with an example embodiment.

Figure 3:
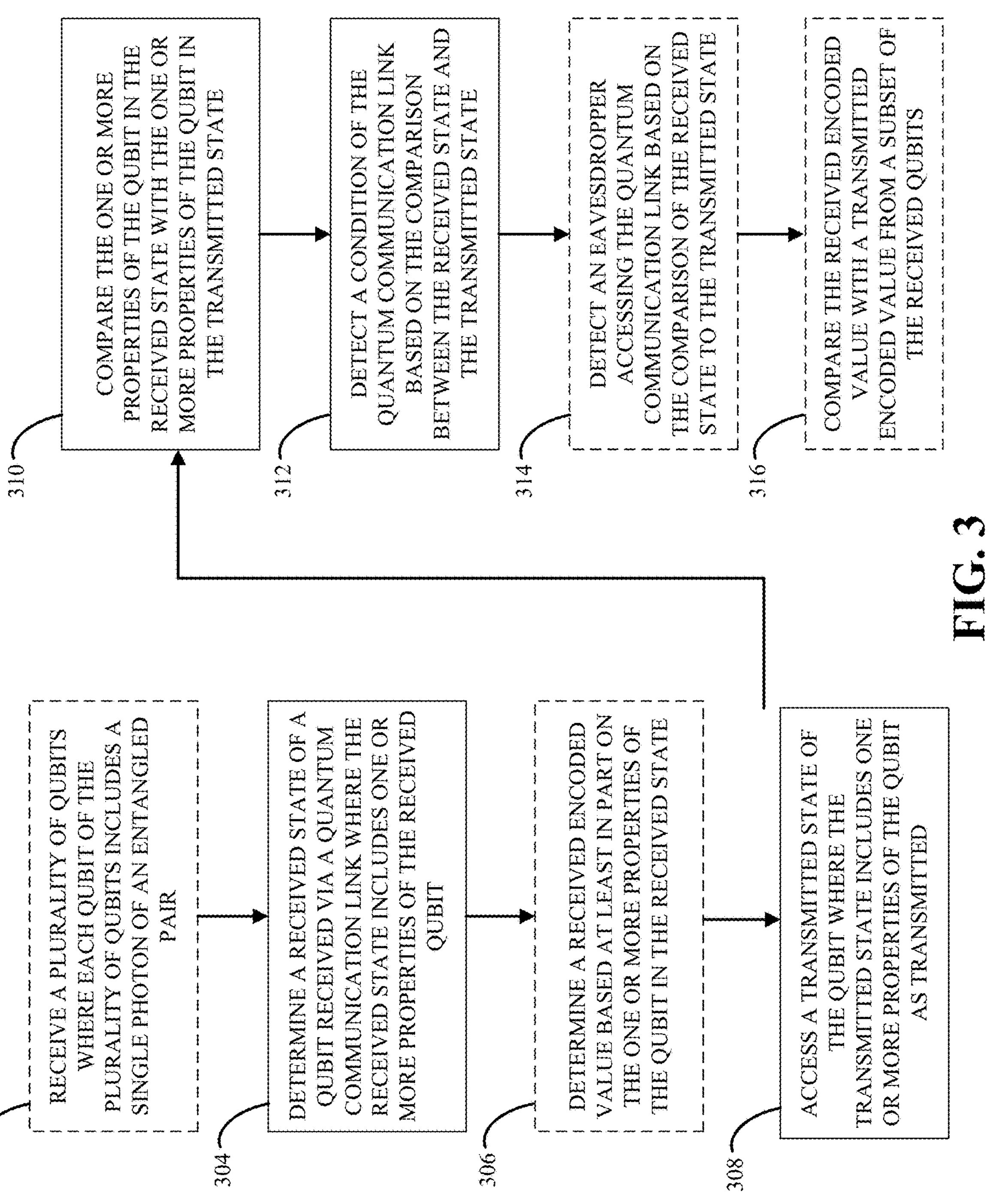

FIG. 3 is a flowchart of an example method for detecting a condition of the quantum communication link in accordance with an example embodiment.

Figure 4:
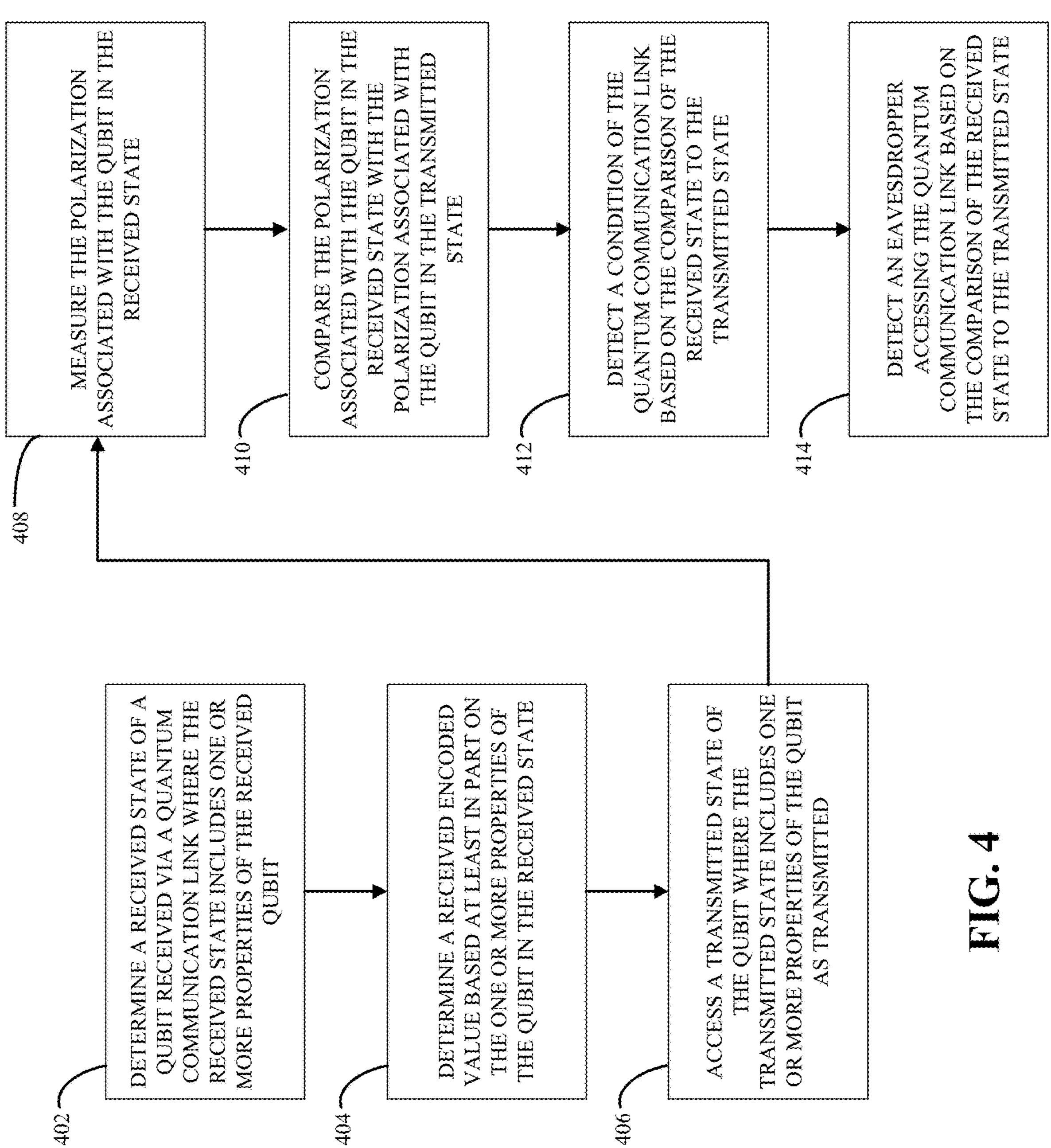

FIG. 4 is a flowchart of an example method for detecting an eavesdropper on a quantum communication link based on the polarization of received quantum particles in accordance with some embodiments.

Figure 5:
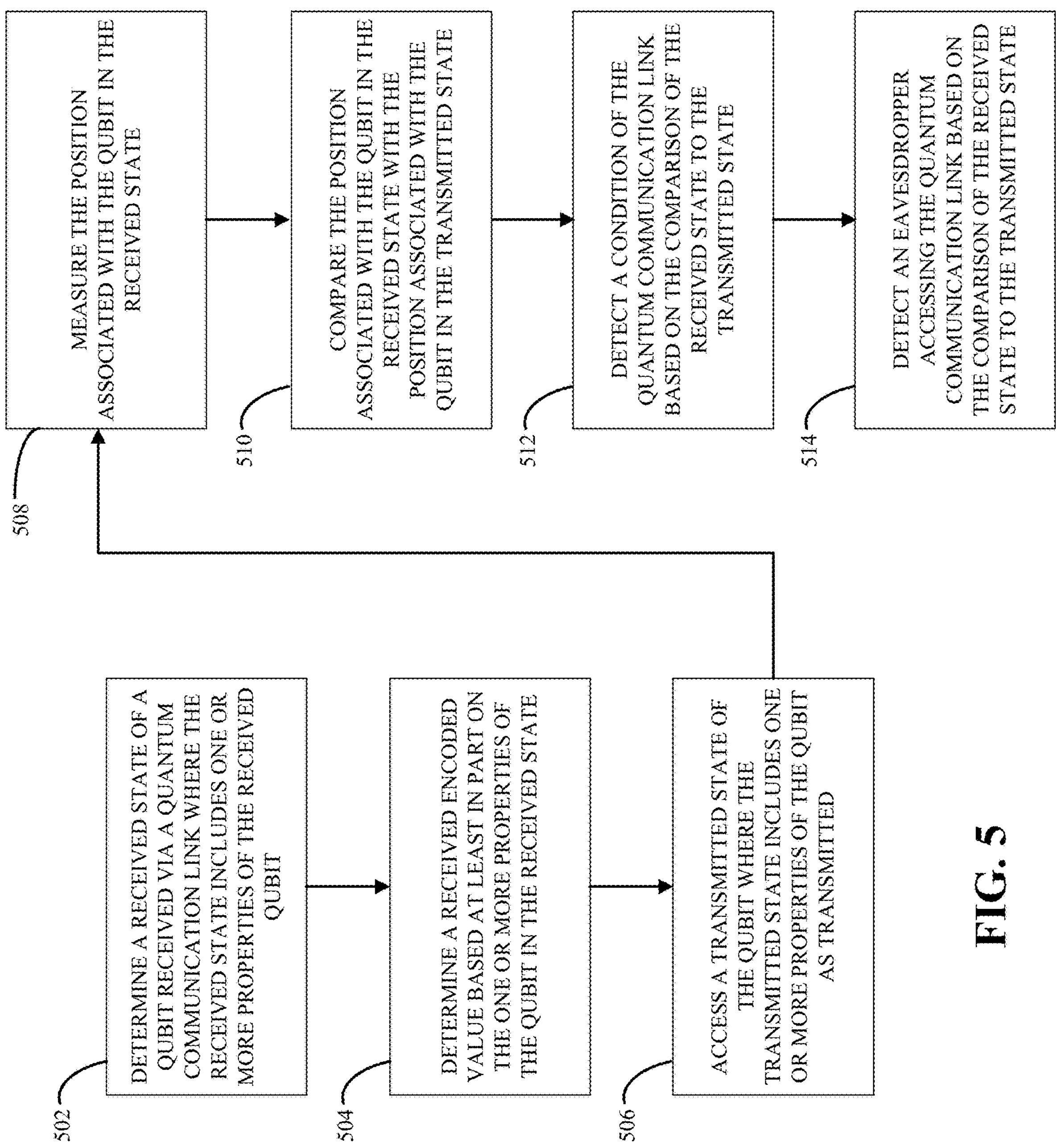

FIG. 5 illustrates a flowchart of an example method for detecting an eavesdropper on a quantum communication link based on the position associated with received qubits in accordance with some embodiments.

Figure 6:
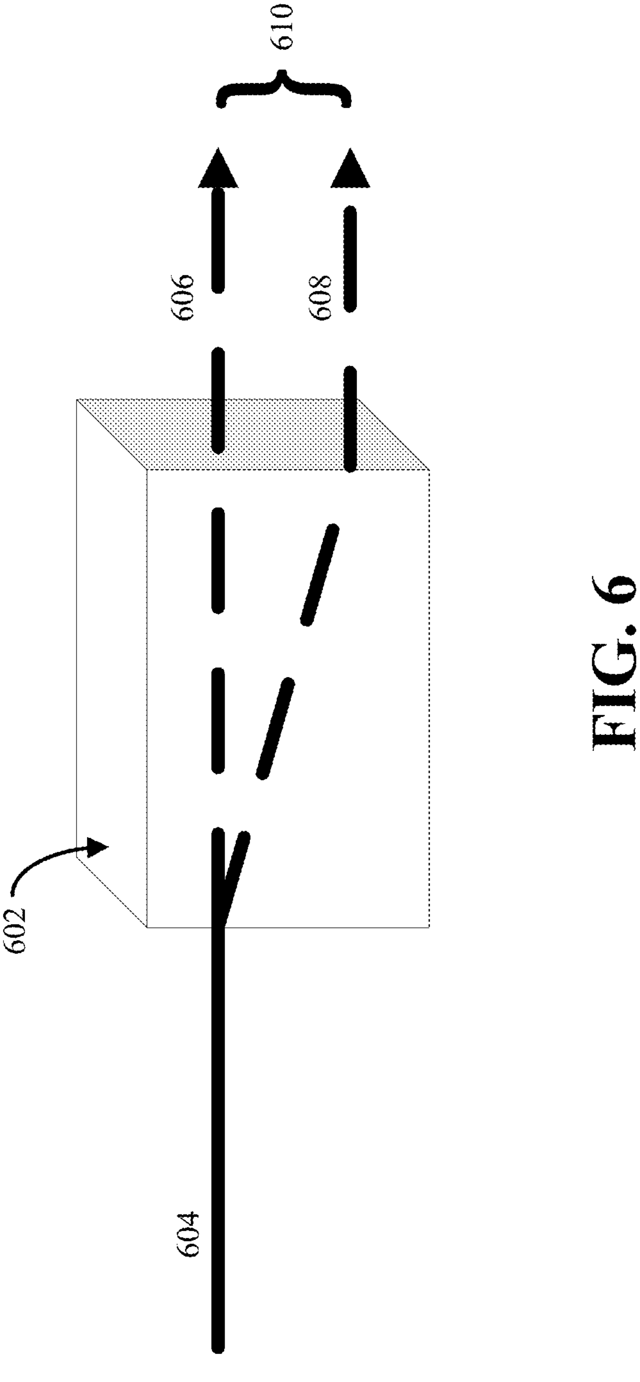

FIG. 6 illustrates a position change introduced by a weak measurement in accordance with some embodiments.

DETAILED DESCRIPTION

Overview

Various embodiments will be described more fully hereinafter with reference to the accompanying drawings in which some but not all embodiments are shown. Indeed, embodiments may take many different forms and should not be construed as limited to the explicit disclosure set forth herein; rather these embodiments are provided so that this disclosure will satisfy applicable legal requirements. Like reference numerals refer to like elements throughout.

Example embodiments are directed to methods, apparatus, and computer program products for detecting a change in state of a quantum communication link. Quantum communication links generally provide a secure pathway to communicate data by relying on certain known and predictable characteristics of quantum mechanics. Quantum communication devices transmit and receive information using quantum bits (e.g., qubits) or higher order qubits by encoding values in the quantum state of a transmitted quantum particle (e.g., spin of an electron, polarization of the quantum particle, phase, position, time of arrival, orbital angular momentum (e.g., of both light and matter), quantized quadratures of light, spatial modes, energy (e.g. excited/ground states of atoms) or frequency (photons), magnetic moment (for matter waves), etc.). Quantum states of quantum particles are sensitive and may be easily influenced by any external stimulation. Therefore, processes for measuring the state of a qubit may detectably change the state of the system. For example, standard measuring techniques, such as projective measurement, cause qubits to collapse to one of the eigenstates of the measured operator. By comparing a subset of the transmitted values with corresponding received values, a transmitter and receiver in a quantum communication system may reliably detect an eavesdropper by detecting differences between the quantum states of the transmitted and received values, so as to ensure that the quantum communication is secure when no substantial differences are detected between the transmitted and received values. Because of the relative ease by which an eavesdropper may be detected (e.g., eavesdroppers using projective or "strong measurements"), quantum communication links have been utilized to facilitate the transmission and reception of secure keys while ensuring that no eavesdroppers are present. Using quantum communication techniques, a sender and receiver can guarantee the security of a transmitted key and reliably use the key in secure operations (e.g., quantum key distribution).

As technology progress, eavesdropper technologies similarly advance such that certain eavesdropper devices may access quantum communication channels without detection using variable-strength quantum measurements or "weak" measurements. An eavesdropper using conventional, projective (e.g., strong) measurements may collapse the state and change the encoded value of a detectable number of transmitted quantum particles. In contrast, an eavesdropper using weak measurements may be able to gather information about the transmission of qubits while only minimally changing the condition of the quantum communication link. Weak measurement techniques may thus enable the eavesdropper to make measurements of transmitted qubits without collapsing the state of the transmitted quantum particle. Standard methods of detecting an eavesdropper are designed to detect an eavesdropper using strong measurements and involve the sender and receiver exchanging a subset of transmissions in which the sender and receiver utilized the same basis to determine the encoded value. The sender may be able to determine access by an eavesdropper device based on the number of changes to the encoded values if an eavesdropper uses projective measurements. Traditional quantum communication devices often presume and rely upon the presumption that an eavesdropper will use projective measurement techniques (e.g., to maximize the amount of information gathered) leaving a detectable trail of collapsed qubits. Therefore, these conventional systems fail to properly detect eavesdropper devices using weak measure techniques and may consequently fail to properly protect against these emerging techniques, particularly in the context of non-idealities that exist in the hardware used in quantum communications and/or the execution of protocols in these communications.

Various methods, apparatuses, and computer program products are therefore provided to counteract these advances in eavesdropper technologies and to more consistently detect eavesdroppers characterized by weak or variable measurement signals accessing a quantum communication link. The techniques of certain embodiments employ a number of approaches that are implemented at various stages of the communication process to prevent an eavesdropper from gathering information undetected, and to provide a way to determine if a transmission was intercepted after the exchange of information occurred. Moreover, certain embodiments provide insight into the operational condition of the quantum communication link to aid in the detection of any interference to a quantum communication link. These techniques may be applied to improve the effectiveness of quantum communication link calibration, detection, and correction of link disturbances, such as non-idealities, noise, decoherence, and other anomalies related to the condition of the quantum communication link. In addition to eavesdropper detection, the embodiments described herein may characterize the noise level and security of a quantum communication channel, particularly in quantum cryptography and quantum key distribution applications. In addition, the method may be utilized to probe a quantum noise level in quantum interconnects, quantum computers/quantum circuits to be used as seed for electronic stabilization loops, and/or quantum error correction algorithms and/or other noise reduction/error correction and related methods.

An example technique described herein to impede the collection of information using weak measurements relies on the transmission of heralded, single quantum particles to increase the difficultly for an eavesdropper to discretely perform multiple weak measurements across multiple quantum particles. Given that weak measurements generated by these eavesdroppers are inherently noisy, these measurements are characterized by a high degree uncertainty in the determination of transmitted values. Therefore, an eavesdropper will perform a large number of weak measurements across a number of quantum particles to reveal any meaningful information from the intercepted transmission. Transmitting from a transmitter using heralded single quantum particles, however, makes it difficult for an eavesdropper to collect the necessary information to determine encoded values of transmitted qubits.

Another example technique described herein to impede the collection of information by an eavesdropper using weak measurement techniques is to secure the identity of basis vectors used to encode transmitted data. By often switching the basis vectors, and randomly switching between basis vectors, a transmitter may make it more difficult for an eavesdropper to discreetly gather information. Such techniques limit an eavesdropper's ability to leverage the fact that a weak measurement does not incur additional noise when the measured operator acts on one of the transmitted quantum particle's eigenstates.

In addition, a number of techniques may be used during transmission to inhibit an eavesdropper using weak measurements from intercepting quantum communication transmissions. One eavesdropping technique is to couple an ancillary quantum particle, coupled to the transmitted qubit, to gather information about the transmitted data. For example, an eavesdropper may utilize the ancillary quantum particle coupled to the qubit to impact the transmitted qubit's momentum and to thereby determine information about the qubit's polarization. Such a technique may not impact or otherwise affect the transmitted polarization. Alternatively, an eavesdropper may obtain measurements related to a transmitted qubit's polarization using an ancillary particle coupled to the transmitted qubit to gather information about the transmitted qubit's position. Thus, to detect an eavesdropper utilizing such a technique, the receiver of the present disclosure may use a camera with sufficient spatial resolution to detect alterations in the spatial location of the transmitted quantum particle when the data is encoded using polarization. Similarly, the receivers described herein may be capable of detecting unexpected polarization shifts when data is encoded based on position. Moreover, the recipient may transmit back (e.g., in the opposing direction) a subset of the transmitted quantum particles for the transmitter to compare against the transmitted quantum particles. With access to the transmitted quantum particles, the transmitters described herein may determine if there were any unexpected phase shifts due to an eavesdropper's measurements.

In certain embodiments, the transmitter and receiver described herein may compare a subset of all outcomes, including those for which the same basis was used and those for which different bases were used. These values may not be used for the generation of the joint secret key shared by the transmitter and receiver but may be used to help detect an eavesdropper. Weak measurements change the statistical likelihood of the receiver's decoded value matching the transmitted value. This statistical difference may be measured, indicating the presence of an eavesdropper using weak measurements. These techniques and others enable a transmitter and receiver in a quantum communication system to reliably detect an eavesdropper using weak measurements, as described herein.

Definitions

Example embodiments will be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as used herein are not intended to convey any qualitative assessment, but rather illustrate particular examples.

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein as receiving data from another computing device, it will be appreciated that the data may be received directly from another computing device or may be received indirectly via one or more intermediary computing devices. Such devices may be, for example, one or more servers, relays, routers, network access points, base stations, hosts, and/or the like, sometimes referred to herein as a "network." Similarly, where a computing device is described herein as sending data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "measurement" may refer to a manipulation of a qubit in a quantum communication to yield the corresponding state of this qubit. An example measurement as described herein may be configured to ascertain or determine any parameter, attribute, etc. of the communication channel and may further be configured to determine, infer, or detect any information, content, and/or data transmitted by the communication channel. For example, the communication channels described herein (e.g., quantum communication links) may use quantum key distribution in order to encrypt or otherwise secure data transmitted by these channels. As such, a measurement described herein may refer to any manipulation that attempts to identify or determine a bit string including at least a part of the keys used to encrypt the underlying data transmitted by the communication channels (e.g., quantum communication links). In some embodiments, the measurement may be performed or otherwise determined by an eavesdropper device (e.g., quantum communication eavesdropper 110).

The terms "strength" or "magnitude" may refer to the physical coupling (e.g., mutual interaction) between the measuring system and the measured signal. The strength or magnitude may be used with reference to example measurements as described above and my further be variable (e.g., variable strength measurements). In some examples described herein, the strength of the measurement may be referred to as "weak" (e.g., a weak measurement) in that the strength of the measurement is such that the observer or eavesdropper obtains less information (relative a "strong" measurement) about the underlying data but also disturbs the communication channel less (e.g., relative a "strong" measurement). Furthermore, the term "weak measurement" may also encompass any variable-strength measurement that does not necessarily lead to collapse as described herein. In other words, the measurements referred to hereinafter as "weak measurements" do not require a particular or defined strength or magnitude, but instead refer to any measurement or collection of measurements that do not necessarily result in collapse.

Embodiments are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Example Quantum Communication System

FIG. 1 illustrates an example quantum communication network 100 according to an embodiment of the present disclosure. As shown in FIG. 1, a quantum communication network 100 may include a quantum communication link 102 facilitating quantum communication between a quantum communication transmitter 106 and a quantum communication receiver 108. In addition, the quantum communication transmitter 106 and quantum communication receiver 108 may be communicatively connected to a communication network 104 providing electronic and/or optical communication between the quantum communication transmitter 106 and the quantum communication receiver 108. Further, FIG. 1 depicts a quantum communication network 100 communicatively connected to the quantum communication link 102 and the communication network 104 over which the quantum communication transmitter 106 and the quantum communication receiver 108 transmit and receive communications.

The illustration of FIG. 1 includes a depiction of a quantum communication link 102. The quantum communication link 102 may be any channel or line capable of transmitting quantum data and particles (e.g., an optical line, a quantum line, etc.). In some embodiments, a quantum communication link 102 may be utilized to transmit and receive quantum data in a combination of quantum two level systems (qubits), for example, by varying certain characteristics, properties, or the like, of a particle, such as the spin of an electron, the polarization associated with a qubit, orbital angular momentum, the time of arrival associated with a qubit, another physical realization, and/or characteristic. In some embodiments, a quantum communication link 102 may be utilized to transmit and receive quantum data in a multi-state combination (e.g., qubits), for example, by varying a combination of states. In some embodiments, the quantum particles transmitted on the quantum communication link 102 may rely on quantum properties such as quantum superposition and/or quantum entanglement to facilitate the transmission of information. In some embodiments, the quantum communication link 102 may be utilized to facilitate a quantum key distribution (QKD) process in which a secret key is created between two devices (e.g., the quantum communication transmitter 106 and the quantum communication receiver 108) connected to the quantum communication link 102. In such embodiments, the communication network 104 and the quantum communication transmitter 106 may attempt to detect the presence of a third party (e.g., a quantum channel eavesdropper 110) potentially intercepting the quantum communications. Although described herein with reference to a quantum communication link 102, the present disclosure contemplates that the example quantum communication link 102 may include any quantum communication channel or structure by which qubits may be transmitted.

FIG. 1 further depicts the quantum communication transmitter 106. The quantum communication transmitter 106 may be any device capable of interfacing with the quantum communication link 102 and the communication network 104 and capable of generating and transmitting physical realizations of one or more qubits and/or qudits. Certain quantum communication transmitters 106 are further configured for receiving physical realizations of one or more qubits and/or qudits. In some embodiments, the quantum communication transmitter 106 may encode data on a quantum particle by varying a quantum state of the transmitted quantum particle with respect to a specific quantum basis (e.g., any properties of the qubit). A quantum basis may refer to a set of orthogonal quantum states. For example, in some embodiments, the quantum communication transmitter 106 may encode data in a physical realization of one or more qubits and/or qudits by varying the polarization. The quantum basis may establish the state variations that may occur, for example, variation in the rectilinear, diagonal, or circular polarization states.

The "rectilinear basis" may refer to the pair of rectilinear polarization states comprising the horizontal polarization state zero degrees and the vertical polarization state ninety degrees. The "diagonal basis" may refer to the pair of diagonal polarization states comprising the diagonal polarization state of 45 degrees and the diagonal polarization state 135 degrees. The "circular basis" may refer to the pair of circular polarization states comprising the left circular polarization state and the right circular polarization state. Similarly, orthogonal quantum bases may be defined for all quantum states for which the quantum communication transmitter 106 may transmit quantum particles. In some embodiments, the quantum communication transmitter 106 may also be capable of transmitting and receiving data on a communication network 104. The quantum communication transmitter 106 may utilize a classical communication network 104 to communicate additional data to the quantum communication receiver 108. For example, in some embodiments, the quantum communication transmitter 106 may exchange basis values used for transmission using a communication network 104. In some embodiments, the quantum communication transmitter 106 may also utilize quantum principles such as quantum superposition and/or quantum entanglement to facilitate the transmission of quantum data and/or to improve the security of a quantum communication link to share quantum information between and/or create entanglement between two (2) or more QPUs (quantum processing units).

FIG. 1 further depicts the quantum communication receiver 108. Similar to the quantum communication transmitter 106, the quantum communication receiver 108 may be any device capable of interfacing with the quantum communication link 102 and the communication network 104 and capable of receiving quantum particles. It should be understood that certain devices may have capabilities of both transmitters and receivers. In addition, in some embodiments, the quantum communication transmitter 106 may also be configured to generate and/or transmit quantum particles as discussed in relation to the quantum communication transmitter 106. Further, in some embodiments, the quantum communication transmitter 106 may be configured to reflect and/or re-transmit transmitted quantum particles through the quantum communication link 102 and back to the quantum communication transmitter 106 or another device connected to the quantum communication link 102. In some embodiments, the quantum communication transmitter 106 may be configured to determine the quantum state of a received quantum particle with respect to a specific quantum basis, which may include, for example, determining the spin of the electrons on a quantum particle, the polarization of a quantum particle, the timing and/or spatial position of a quantum particle, the phase of a quantum particle, and/or other similar measurements or properties.

In some embodiments, the quantum communication receiver 108 may randomly select a quantum basis from a set of possible quantum bases to measure the particular quantum state of a received quantum particle. In quantum key distribution (QKD) environments, the quantum communication receiver 108 may later compare quantum bases randomly selected by the quantum communication receiver 108 with transmitted quantum bases and utilize the information from the transmissions in which the selected quantum basis matches the transmitted quantum basis to determine a secure key and further determine if a quantum channel eavesdropper 110 has intercepted the transmission using projective measurements.

In some embodiments, the quantum communication receiver 108 may be capable of making multiple measurements of a transmitted quantum particle to determine the encoded data and/or to detect the presence of a quantum channel eavesdropper 110 making measurements on the transmitted data and affecting the condition of the quantum communication link 102. For example, the quantum communication transmitter 106 may transmit data encoded in the polarization of a particular quantum particle. In order to avoid detection, the quantum channel eavesdropper 110 may perform weak measurements to glean information from the transmitted quantum particles without collapsing the state of the quantum particle to one of the basis states. If the quantum communication network 100 uses polarization as a method for encoding information, the following technique may be used to determine the polarization of a quantum particle in a certain basis. The eavesdropper 110 mayo weakly couple a qubit to a quantum particle's momentum that may be the momentum of the same transmitted qubit, such that spatial shifts in the quantum particle may correspond to the transmitted polarization value in a certain basis. Using this method, the eavesdropper 110 may determine or otherwise obtain information about the quantum particle's polarization in a certain basis (and encoded information) while minimally disturbing the polarization state of the quantum particle.

If the quantum communication transmitter 106 encodes information in the time of arrival or in the spatial location of the quantum particle, the quantum channel eavesdropper 110 may measure the polarization of the quantum particle to obtain information about the quantum particle's position (by weakly coupling to the particle), while only minimally disturbing the position of the transmitted quantum particle. As such, the quantum communication receiver 108, in some embodiments, may measure the polarization of the transmitted quantum particle to determine the encoded data, and further, the quantum communication receiver 108 may measure the position of the same quantum particle to determine if the position was altered during transmission by, for example, the quantum channel eavesdropper 110 weakly measuring the transmitted data. Similarly, the quantum communication receiver 108, in some embodiments, may measure the position of a transmitted quantum particle to determine the encoded data. In addition, the quantum communication receiver 108 may measure the polarization of the same quantum particle to determine if unexpected polarization shifts occurred during transmission by, for example, the quantum channel eavesdropper 110 making weak measurements of the transmitted data. In some embodiments, the quantum communication receiver 108 may comprise a single-quantum particle avalanche diode (SPAD) array or other similar imaging device configured to capture and measure the spatial location of a single quantum particle to aid in determining the position of a received quantum particle. Although described herein with reference to polarization and positional changes, the present disclosure contemplates that the embodiments herein may analyze any property or plurality of properties of qubits to detect the presence of the quantum channel eavesdropper 110.

FIG. 1 further depicts the quantum channel eavesdropper 110 (e.g., eavesdropper device). The quantum channel eavesdropper 110 may be any device capable of interfacing with the quantum communication link 102 for purposes of measuring quantum particle transmissions between the quantum communication transmitter 106 and the quantum communication receiver 108. There are a number of ways the quantum channel eavesdropper 110 may measure transmitted quantum particles to determine the data encoded in the quantum characteristics of the transmitted particle. One method of measuring quantum particles transmitted on the quantum communication link 102 is to use projective, or strong, measurements.

Projective measurements may be more readily detected in the transmission of quantum particles because projective measurements not only probe the state of the transmitted quantum particle, but these measurements also determine the state. That is, upon performing a projective measurement, the superposition state "collapses" to one of the eigenstates of the measurement operator, in some instances, reducing the superposition quantum state of the particle to a partial state of the transmitted particle where the original superposition quantum state of the particle cannot be recovered due to loss of information. The quantum communication transmitter 106 and quantum communication receiver 108 may detect the quantum channel eavesdropper 110 using projective measurements by exchanging and comparing a subset of the transmitted values after the transmission is complete. If the decoded values received at the quantum communication receiver 108 in instances in which the quantum communication receiver 108 selected the basis matching the transmitted basis are different to an extent more significant than that attributable to noise (e.g., as compared to a determined noise threshold or the like), the quantum communication transmitter 106 and the quantum communication receiver 108 may determine or otherwise conclude that another party (e.g., quantum channel eavesdropper 110) is measuring the transmitted quantum particles.

Another method of measuring quantum particles is to use variable-strength quantum measurements, or weak measurements as defined above. Weak measurements may allow the quantum channel eavesdropper 110 to apply a sequence of measurements that provide the eavesdropper with minimal information but rarely collapse the quantum state, allowing the eavesdropper to continue to monitor the quantum communication link 102 undetected by conventional detection techniques. While weak measurements may rarely collapse the state of the measured quantum particles and change the value of the encoded information, the weak measurement may perceptibly alter the condition of the quantum communication link 102. Such alterations may be detected using the techniques of the present disclosure. In addition, weak measurements are inherently noisy, meaning the resulting measurement has a large uncertainty. Thus, a quantum channel eavesdropper 110 performing weak measurements may need to perform many weak measurements before gaining useful information.

FIG. 1 further depicts the communication network 104. The communication network 104 may be any network or system of networks allowing wired and/or wireless communication between connected nodes. By way of a nonlimiting example, the communication network 104 may be a wired or wireless local area network (LAN), personal area network (PAN), metropolitan area network (MAN), wide area network (WAN), or the like. The communication network 104 may also include any hardware, software and/or firmware required for implementing the one or more networks (e.g., network routers, switches, hubs, etc.). For example, the communication network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communication network 104 may include a public network, such as the Internet, a private network, such as an intranet, or combinations thereof, and may utilize a variety of networking protocols now available or later developed including, but not limited to TCP/IP based networking protocols.

Example Quantum Communication Device(s)

FIG. 2 shows a schematic block diagram of example circuitry, some or all of which may be included in any quantum communication device of the present disclosure (e.g., the quantum communication transmitter 106, the quantum communication receiver 108, and/or the quantum channel eavesdropper 110). In accordance with some example embodiments, these quantum communication devices may include various means, such as memory 201, processor 202, controller 203, and/or communication interface 204. Moreover, in some embodiments, the quantum communication interface 205 may also or instead be included in the quantum communication device. For example, where a quantum communication interface 205 is included in a quantum communication device, a quantum communication interface 205 may be configured to facilitate the functionality discussed herein regarding generating, transmitting, reflecting, and/or re-transmitting quantum particles on a quantum communication link 102. An apparatus, such as a quantum communication device, may be configured, using one or more of circuitry 201-205 to execute the operations described above with respect to FIG. 1 and below in connection with FIGS. 3-5.

Although the use of the term "circuitry" as used herein with respect to components 201-205 are described in some cases using functional language, it should be understood that the particular implementations necessarily include the use of particular hardware configured to perform the functions associated with the respective circuitry as described herein. It should also be understood that certain of these components 201-205 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the quantum communication device may be housed within this device, while other components are housed within another of these devices, or by yet another device not expressly illustrated in FIG. 1.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the quantum communication device may provide or supplement the functionality of particular circuitry. For example, the processor 202 may provide processing functionality, the memory 201 may provide storage functionality, the communication interface 204 may provide network interface functionality, and the like.

In some embodiments, processor 202 (and/or co-processor or any other processing circuitry assisting or otherwise associated with the processor) may be in communication with memory 201 via a bus for passing information among components of, for example, a quantum communication device. Memory 201 may be non-transitory and may include, for example, one or more volatile and/or non-volatile memories, or some combination thereof. In other words, memory 201 may be an electronic storage device (e.g., a non-transitory computer readable storage medium). Memory 201 may be configured to store information, data, content, applications, instructions, or the like, for enabling an apparatus (e.g., a quantum communication device 106, 108, 110), to carry out various functions in accordance with example embodiments of the present disclosure.

Although illustrated in FIG. 2 as a single memory, the memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling quantum communication device to carry out various functions in accordance with example embodiments discussed herein. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by quantum communication device during the course of performing its functionalities.

Processor 202 may be embodied in a number of different ways and may, for example, include one or more processing devices configured to perform independently. Additionally, or alternatively, processor 202 may include one or more processors configured to work in tandem via a bus to enable independent execution of instructions, pipelining, and/or multithreading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as quantum communication device. The plurality of processors may be in operative communication with each other and may be collectively configured to perform one or more functionalities of quantum communication device as described herein.

In an example embodiment, the processor 202 is configured to execute instructions stored in memory 201 or otherwise accessible to processor 202. Alternatively, or additionally, processor 202 may be configured to execute hard-coded functionality. As such, whether configured by hardware or software methods, or by a combination thereof, processor 202 may represent an entity (e.g., physically embodied in circuitry) capable of performing operations according to an embodiment of the present disclosure while configured accordingly. Alternatively, as another example, when processor 202 is embodied as an executor of software instructions, the instructions may specifically configure processor 202 to perform one or more algorithms and/or operations described herein when the instructions are executed. For example, these instructions, when executed by processor 202, may cause the quantum communication device 106, 108, 110 to perform one or more of the functionalities of the quantum communication device as described herein.

The communication interface 204, in some embodiments, may include any means, such as a device or circuitry embodied in either hardware, software, firmware or a combination of hardware, software, and/or firmware, that is configured to receive and/or transmit data from/to a network and/or any other device, circuitry, or module in communication with the quantum communication device 106, 108, 110. In this regard, the communication interface 204 may include, for example, a network interface for enabling communications with a wired or wireless communication network 104. For example, in some embodiments, communication interface 204 may be configured to receive and/or transmit any data that may be stored by memory 201 using any protocol that may be used for communications between computing devices. For example, communication interface 204 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communication interface 204 includes circuitry for interacting with the antenna(s) to cause transmission of signals via the antenna(e) or to handle receipt of signals received via the antenna(e). These signals may be transmitted by the quantum communication device using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communication interface 204 may additionally or alternatively be in communication with the memory 201, input/output circuitry 203 and/or any other component of quantum communication device, such as via a bus.

In some embodiments, the quantum communication interface 205 may include any means, such as a device or circuitry embodied in either hardware, software, firmware or a combination of hardware, software, and/or firmware, that is configured to receive and/or transmit data from/to a quantum communication link 102 and/or any other device, circuitry, or module in communication with the quantum communication device via the quantum communication link 102. In this regard, for example, the quantum communication interface 205 may be configured to be an analog to quantum communication bridge configured to convert physical layer digital signal representations from and/or to qubit and/or qubit states. In some embodiments, the quantum communication interface 205 may include means, such as imaging devices, polarizing beam splitters, and the like to capture and measure quantum particles to facilitate decoding of transmitted data and detect changes to the condition of the quantum communication link 102.

In addition to the components above, the devices and systems described herein may further include one or more of (1) a module for performing photon number splitting, (2) a module for performing optimal quantum cloning, (3) a quantum memory for saving some photons from the transmitted pulse or an approximation thereof or quantum clones thereof for a later use (e.g., after the parties have announced the measurement bases), and/or (4) a quantum source for re-emitting photons into the quantum channel. In other words, the quantum communication transmitter 106, the quantum communication receiver 108, and/or the eavesdropper device 110 may include any suitable optical elements and detectors/imagers for measuring various properties of the transmitted particles described herein.

Example Methods for Quantum Communications

FIG. 3 illustrates a flowchart of an example method for determining a condition of the quantum communication link 102. In some embodiments, the operations illustrated in FIG. 3 may, for example, be performed by, with the assistance of, and/or under the control of a quantum communication device (e.g., quantum communication transmitter 106 and/or quantum communication receiver 108), as described above. In this regard, performance of the operations may invoke one or more of processor 202, controller 203, memory 201, communication interface 204, and/or quantum communication interface 205.

As shown in block 302, the method may include receiving a plurality of qubits where each qubit of the plurality of qubits comprises a single photon of an entangled pair. In some embodiments, the quantum communication device may leverage principles of quantum mechanics, such as quantum entanglement, to detect a change to the condition of the quantum communication link 102 and/or make it more difficult for the quantum channel eavesdropper 110 using weak measurements to gather the information necessary to determine the encoded data of a transmitted quantum particle. For example, the quantum communication transmitter 106 may, in some embodiments, generate an entangled pair of quantum particles encoded with data associated with some state or states of the quantum particle (e.g., heralded photons). The quantum communication transmitter 106 may then separate the entangled pair and send a single quantum particle of the entangled pair to the quantum communication receiver 108. Due to the noisy nature of weak measurements, the quantum channel eavesdropper 110 may need to perform several measurements on the plurality of quantum particles before gathering enough information to determine the encoded data contained in a stream of quantum particles. By sending and receiving a single quantum particle, the quantum channel eavesdropper 110 may be unable to reliably gather enough information to determine the encoded data on a given quantum particle.

In some embodiments, the quantum communication receiver 108 may also reflect or retransmitted a subset of the transmitted quantum particles for the quantum communication transmitter 106 to compare with the corresponding entangled quantum particle. In some embodiments, comparisons between the transmitted/returned entangled quantum particle and the retained quantum particle of the entangled pair after transmission and return may aid in detecting a condition of the quantum communication link 102. For example, the quantum channel eavesdropper 110 may add temporal phase to the quantum particle or group of quantum particles when measuring a transmitted quantum particle or group of particles. The quantum communication transmitter 106 may, in some embodiments, perform an interference test to detect the change in temporal phase.

As shown in block 304, the method may include determining a received state of a qubit received via a quantum communication link 102 where the received state includes one or more properties of the received qubit. In some embodiments, the quantum communication device (e.g., quantum communication transmitter 106 and/or quantum communication receiver 108) may be configured to receive and determine the state and/or properties of a transmitted quantum particle. For example, the quantum communication receiver 108 may determine the polarization, phase, position, time of arrival, spin of an electron, orbital momentum, or other state of the received quantum particle (e.g., photon). As described in relation to FIG. 1, the quantum communication device may include means to measure the above mentioned and other characteristics related to the state of a received quantum particle.

As shown in block 306, in some embodiments, the method may include determining a received encoded value based at least in part on the one or more properties of the qubit in the received state. In some embodiments, the quantum communication device (e.g., quantum communication receiver 108) may utilize the determined quantum particle state information related to a received quantum particle to determine the transmitted data. In some embodiments, the state characteristic or characteristics in which the quantum communication transmitter 106 has transmitted the data may be communicated to the quantum communication transmitter 106 or provided in a pre-determined table or list. For example, the quantum communication transmitter 106 may know that the transmitted data is encoded in a quantum particle's polarization, spatial position, and/or some combination thereof.

In some embodiments, the basis of the quantum particle state used to encode the transmitted data may not be communicated to the quantum communication receiver 108 or any other quantum communication device before the quantum particle is transmitted. In such an embodiment, the quantum communication transmitter 106 must determine (e.g., randomly select) a basis to be used in measuring the transmitted state characteristic of a transmitted quantum particle. For example, the quantum communication transmitter 106 may be configured to encode data in a transmitted quantum particle's polarization using a rectilinear basis or a diagonal basis. The quantum communication receiver 108 may be notified that the data will be encoded in the quantum particle's polarization according to a rectilinear basis or a diagonal basis but the quantum communication transmitter 106 may not notify the quantum communication receiver 108 which polarization basis is used before or during the transmission of the polarized quantum particle. The quantum communication receiver 108 must select a basis (e.g., rectilinear basis) to measure the state of the transmitted quantum particle without an indication as to which basis the quantum communication transmitter 106 used to encode the data. Subsequently, the quantum communication transmitter 106 may transmit to the quantum communication receiver 108 the basis used for each sent and received quantum particle (or vice versa), and the quantum communication devices 106, 108 may compare and utilize only the data for which the quantum particle was transmitted and measured using the same basis. In some embodiments, a transmitted quantum particle may represent a qudit, meaning the transmitted data on a single quantum particle is encoded in one of two possible states. In some embodiments, a transmitted quantum particle may represent a qudit, meaning the transmitted data on a single quantum particle is encoded in the superposition of "d" states, where "d" is a natural number greater than two.

As shown in block 308, the method may include accessing a transmitted state of the qubit where the transmitted state includes one or more properties of the qubit as transmitted. As described in reference to block 304, a quantum particle may be received with a number of different measurable state characteristics or properties (e.g., polarization, phase, position, time of arrival, spin of an electron, orbital momentum, etc.). The received state of the quantum particle may or may not match the state of the transmitted quantum particle. In some embodiments, the quantum communication transmitter 106 may provide access to the transmitted state and associated characteristics of the transmitted quantum particle. This information may be provided through a communication network 104, may be written to a common database, or may be provided in a similar manner, such that the quantum communication receiver 108 may access the state characteristics of the transmitted quantum particles. In some embodiments, the quantum communication receiver 108 may be provided access to a subset of the states of the transmitted quantum particles. In some embodiments, the quantum communication receiver 108 may be provided access to all of the states of the transmitted quantum particles. In some embodiments, the transmitted quantum particles may be reflected and/or retransmitted by the quantum communication receiver 108 providing the quantum communication transmitter 106 access to the received states of the transmitted quantum particles. In such embodiments, the transmitter may determine changes in the condition of the quantum communication link 102 based on the recorded state of the transmitted quantum and/or by comparing the reflected or retransmitted quantum particle with a second quantum particle of an entangled pair.

As shown in block 310, the method may include comparing the one or more properties of the qubit in the received state with the one or more properties of the qubit in the transmitted state. In some embodiments, once the quantum communication receiver 108 establishes access to the transmitted state of a quantum particle and after the quantum communication receiver 108 has determined a set of properties of the received quantum particle corresponding to the quantum particle's state, the quantum communication receiver 108 may compare the determined state properties of the quantum particle with the state properties of the same quantum particle at transmission. In some embodiments, the quantum communication receiver 108 may compare one or more properties corresponding to the polarization of the quantum particle, the phase of the quantum particle, the position of the quantum particle, the time of arrival of the quantum particle, the spin of an electron of the quantum particle, the orbital momentum of a quantum particle, and/or the like. Comparing state properties may include, in some embodiments, direct comparison with the recorded state properties of the transmitted quantum particle. In some embodiments, a comparison may be made between the received state properties and an adjusted or projected state property based on the transmitted state of the quantum particle. For example, a transmitted state property may be adjusted or projected based on the transmission time of the quantum particle, transmission noise, measurement error, or another condition of transmission. In some embodiments, a measured state property by the quantum communication receiver 108 may be compared to a range of values based on the transmitted state property and accounting for other factors, such as, measurement error, noise, calculation errors, and/or the like.

As shown in block 312, the method may include detecting a condition of the quantum communication link 102 based on the comparison between the received state and the transmitted state. In some embodiments, after comparing the received state of one or more quantum particles with the state of the one or more quantum particles at the time of transmission, the quantum communication device may detect a condition of the quantum communication link 102. A detected condition of the quantum communication link 102 may include an unknown device measuring transmitted quantum particles. In some embodiments, an unknown device may be an eavesdropper device (e.g., quantum channel eavesdropper 110) attempting to gather information from the transmitted quantum particles and decode the transmitted values. In some embodiments, a detected condition of the quantum communication link 102 may include other non-idealities of the quantum communication link 102. For example, a non-ideality of the quantum communication link 102 may include an anomaly in the physical characteristics of the quantum communication link 102 resulting in undesirable noise or delay in the transmitted quantum particles. As another example, a non-ideality of the quantum communication link 102 may include faulty equipment involved in the creation, transmission, or detection of the quantum particles resulting in increased noise or delay. The present disclosure further contemplates that noise and/or decoherence may arise from one or more intrinsic properties of the system 100 (e.g., internal absorptions, impurities, etc.) in addition or as an alternative to noise from an external environment. As would be evident in light of the embodiments described herein, the "state" of a qubit, quantum particle, or photon refers to the wavefunction of the photon while the "state" of the quantum communication link determined by the method of FIG. 3 refers to the determination and/or characterization of any noise, decoherence, and/or eavesdropping associated with the quantum communication link 102 (e.g., quantum communication channel).

In some embodiments, one or more of the above-described steps may be performed by the quantum communication transmitter 106. For example, the quantum communication transmitter 106 may split a selected set of quantum particles via a beam splitter before transmission. The quantum communication transmitter 106 may retain one set of the generated quantum particles while the split set is transmitted to the quantum communication receiver 108. The receiver may reflect the received quantum particle back to the quantum communication transmitter 106 so the transmitter may reunite the quantum particles that were split and transmitted with the quantum particles that were retained. Comparing the transmitted quantum particles with the retained quantum particles may allow the quantum communication transmitter 106 to detect a condition of the quantum communication link 102.

As shown in block 314, in some embodiments, the method may further include detecting an eavesdropper accessing the quantum communication link 102 based on the comparison between the received state and the transmitted state. As a result of measurements made by the quantum channel eavesdropper 110 on the quantum communication link 102, a number of detectable changes may occur in relation to the condition of the quantum communication link 102 and the quantum particles transmitted via the quantum communication link 102. For example, an unexpected change in the time of arrival of a transmitted quantum particle, a change in the spatial location of the transmitted quantum particle, a change in the polarity of a transmitted quantum particle, a change in the phase of a transmitted quantum particle, and/or the like. In some embodiments, the quantum communication receiver 108 may determine that modifications to the state characteristics of transmitted quantum particles are due to measurements performed by a third party on the quantum communication link 102 and not due to noise or another anomaly of the quantum communication link 102. In some embodiments, the quantum communication receiver 108 may determine that the modifications to the quantum communication link 102 are attributable to a third-party measurer (e.g., quantum channel eavesdropper 110) because the rate of modified quantum particles is statistically more significant than a pre-determined baseline rate of modifications due to noise or other anomalies.

For example, it may be determined that the state characteristics of 1% of transmitted quantum particles are changed in a standard, noisy quantum communication link 102. Thus, if a quantum communication receiver 108 determines that the state characteristics of 5% of transmitted quantum particles are modified, the quantum communication receiver 108 may determine that the modifications are due to the quantum channel eavesdropper 110. In some embodiments, the quantum communication receiver 108 may determine that the modifications to the quantum communication link 102 are attributable to a third-party measurer (e.g., quantum channel eavesdropper 110) because the magnitude of the modifications to the state characteristics of quantum particles is greater than a pre-determined baseline magnitude of modifications for the given state characteristic. For example, it may be determined that a displacement of a transmitted quantum particle of up to 5 microns may occur in a standard, noisy quantum communication link 102. Thus, if the quantum communication receiver 108 determines that the quantum particles are displaced by 20 microns, the quantum communication receiver 108 may determine that the modifications are due to the quantum channel eavesdropper 110. Techniques of determining the presence of the quantum channel eavesdropper 110 based on detecting changes to the condition of the quantum communication link 102 are critical in detecting the quantum channel eavesdropper 110 using weak measurements, since the weak measurements rarely result in changes to the encoded data, upon which conventional eavesdropper detection systems generally rely.

As shown in block 316, in some embodiments, the method may further include comparing the received encoded value with the transmitted encoded value from a subset of the received qubits and detecting the condition of the quantum communication link 102 based on the comparison of the subset of received encoded values and transmitted encoded values. The subset of the received qubits includes received encoded values where the determined basis vector matches the transmitted basis vector and received encoded values where the determined basis vector fails to match the transmitted basis vector. Detection of the quantum channel eavesdropper 110 using projective measurements may involve the quantum communication transmitter 106 and the quantum communication receiver 108 exchanging the basis used to determine the encoding of a particular quantum particle transmission and the determined encoded value. In some embodiments, the exchange of results may occur utilizing the communication network 104. Detection may presume the use of projective measurements and that those projective measurements will result in a detectable number of collapsed quantum particles resulting in a change to the encoded value. Thus, in conventional detection schemes, transmitters and receivers will only compare decoded values for which the receiver used the same basis to determine the encoded value as the transmitter 106 used to encode the data on the quantum particle. While the quantum communication transmitter 106 and the quantum communication receiver 108 of the present disclosure may continue to compare decoded values for which the quantum communication receiver 108 decoded the value using the same basis as the quantum communication transmitter 106 used to encode the value, in some embodiments of the present disclosure, the quantum communication receiver 108 and the quantum communication transmitter 106 may also compare decoded values for cases in which they did not use the same basis.

These cases may not be used for constructing a joint secret key, for example in a QKD generation, and hence may be fully utilized for the purpose of detecting the quantum channel eavesdropper 110. After a weak measurement is performed by the quantum channel eavesdropper 110, the state of the quantum particle received by quantum communication receiver 108 is given by the equation:

$$|\psi_{WM}\rangle = \sqrt{1-\varepsilon}|\psi\rangle + \sqrt{\varepsilon}|\psi_\perp\rangle$$

where $|\psi\rangle$ is the initial transmitted state of the quantum particle, $|\psi_{WM}\rangle$ is the state of the quantum particle after a weak measurement is performed, $|\psi_\perp\rangle$ is a state of the quantum particle orthogonal to the transmitted state, and the value $\varepsilon$ is typically small and depends on the strength of the measurement performed on the quantum communication link 102. The success probability of projecting onto a given state $|\phi\rangle$ at the quantum communication receiver 108 would now be $|\langle\phi|\psi_{WM}\rangle|^2$ instead of $|\langle\phi|\psi\rangle|^2$. The change in probability as described may be detected given a sufficient number of cases and comparing the values decoded by the quantum communication receiver 108 with the values encoded by the quantum communication transmitter 106.

FIG. 4 illustrates a flowchart of another example method for determining a condition of the quantum communication link 102 utilizing measurements of the polarization state of a received quantum particle. Similar to FIG. 3, in some embodiments, the operations illustrated in FIG. 4 may, for example, be performed by, with the assistance of, and/or under the control of a quantum communication device (e.g., quantum communication transmitter 106 and/or quantum communication receiver 108), as described above. In this regard, performance of the operation may invoke one or more of processor 202, controller 203, memory 201, communication interface 204, and/or quantum communication interface 205.

Similar to FIG. 3, as shown in blocks 402, 404, and 406, the method of FIG. 4 may also include determining a received state of a qubit received via a quantum communication link 102, wherein the received state comprises one or more properties of the received qubit, determining a received encoded value based at least in part on the one or more properties of the qubit in the received state, and accessing a transmitted state of the qubit, wherein the transmitted state comprises one or more properties of the qubit as transmitted.

As shown in block 408, the method may further include measuring the polarization of the qubit in the received state.

The quantum communication receiver 108 may, in some embodiments, measure the polarization of a received quantum particle to aid in detecting a condition of the quantum communication link 102, for example, if a quantum channel eavesdropper 110 may be present and intercepting the transmitted data. In some embodiments, a quantum channel eavesdropper 110 may weakly measure the polarization of a quantum particle in an effort to determine spatial shifts in a transmitted quantum particle, which may be representative of the transmitted quantum particle's encoded value. Small shifts in the polarization of a transmitted quantum particle may be indicative of a quantum channel eavesdropper 110. The quantum communication receiver 108 may measure polarization using a combination of polarizing beam splitters and/or polarization filters and photodetectors. For example, the quantum communication receiver 108 may include one or more polarization beam splitters in order to split the light into separate phase components. A photodetector may then measure the magnitude of each of these components and determine the polarization of the transmitted quantum particle.

As shown in block 410, the method may further include comparing the polarization associated with the qubit in the received state with the polarization associated with the qubit in the transmitted state. After the polarization of a received quantum particle is determined, the quantum communication receiver 108 may compare the phase of the polarization of the received quantum particle with the transmitted polarization of the same quantum particle to determine if there has been a shift in the polarization, possibly indicative of a quantum channel eavesdropper 110 performing measurements on the transmitted data. To compare the polarization states, a quantum communication device may need access to both polarization states. In some embodiments, the transmitted polarization state may be provided to the quantum communication receiver 108 as described above in relation to FIG. 3. In some embodiments, one or more transmitted quantum particles may be reflected or retransmitted to the quantum communication transmitter 106 and the comparison may be performed by the quantum communication transmitter 106. In some embodiments, the quantum communication receiver 108 may compare the measured phase of the received quantum particle with the transmitted or otherwise available phase of the transmitted quantum particle, identifying shifts or other anomalies in the received phase.

Similar to FIG. 3, as shown in blocks 412 and 414, the method of FIG. 4 may also include detecting the condition of the quantum communication link 102 based on the comparison of the received state to the transmitted state and detecting an eavesdropper accessing the quantum communication link 102 based on the comparison of the received state to the transmitted state. Detecting a shift in the polarization of a received quantum particle may be a key factor when detecting a quantum channel eavesdropper 110 when data is encoded using spatial position. For example, if a quantum communication transmitter 106 encodes information in the spatial position of the quantum particle, the quantum channel eavesdropper 110 may measure the polarization of the quantum particle to obtain information about the quantum particle's position without disturbing the position of the transmitted quantum particle. However, shifts to the phase of the quantum particle will be introduced as a result of the measurement. A quantum communication receiver 108 or quantum communication transmitter 106 according to embodiments of the present disclosure may detect a quantum channel eavesdropper 110 by detecting shifts in the transmitted quantum particles.

FIG. 5 illustrates a flowchart of another example method for determining a condition of the quantum communication link 102 utilizing measurements of the position of a received quantum particle. Similar to FIG. 3, in some embodiments, the operations illustrated in FIG. 5 may, for example, be performed by, with the assistance of, and/or under the control of a quantum communication device (e.g., quantum communication transmitter 106 and/or quantum communication receiver 108), as described above. In this regard, performance of the operation may invoke one or more of processor 202, controller 203, memory 201, communication interface 204, and/or quantum communication interface 205.

Similar to FIG. 3, as shown in blocks 502, 504, and 506, the method of FIG. 5 may also include determining a received state of a qubit received via a quantum communication link 102, wherein the received state comprises one or more properties of the received qubit, determining a received encoded value based at least in part on the one or more properties of the qubit in the received state, and accessing a transmitted state of the qubit, wherein the transmitted state comprises one or more properties of the qubit as transmitted.

As shown in block 508 the method may further include measuring the position of the qubit in the received state. The quantum communication receiver 108 may, in some embodiments, measure the position of the receive quantum particle to aid in detecting the condition of the quantum communication link 102, for example, detecting the presence of a quantum channel eavesdropper 110. In some embodiments, a quantum channel eavesdropper 110 may perform weak measurements related to the position of the transmitted quantum particle to determine information related to the polarization of a quantum particle, in an instance when the polarization of the quantum particle may be representative of the transmitted quantum particle's encoded value. The weak measurements may allow a quantum channel eavesdropper 110 to determine information related to the quantum particle's encoded value without the risk of collapsing the state of the transmitted quantum particles.

The quantum communication receiver 108 may measure any characteristic of the quantum particle, including but not limited to the spatial location of the received quantum particle and/or the time of arrival of a received quantum particle. The quantum communication receiver 108 may, in some embodiments include an imaging device for measuring the quantum particle's spatial location. To accurately determine the spatial location of a received quantum particle, the quantum communication receiver 108 may, in some embodiments, include an imaging device with sufficient spatial resolution, capable of capturing image information at an individual photon level, for example, a single photon imager or SPAD array. The quantum communication receiver 108 equipped with a SPAD array or other similar photon detecting technology may measure and record the position characteristics of the received state of the qubit. The quantum communication receiver 108 may, in some embodiments, include spatial and/or temporal interferometers to provide time-of-arrival clock synchronization and high temporal resolution, respectively, when measuring the time of arrival of the received quantum particle.

As shown in block 510, the method may further include comparing the position of the photo qubit n in the received stated with the position of the qubit in the transmitted state. As described in relation to block 508 various characteristics related to the position of a received quantum particle may be measured and recorded, such as the spatial location and time of arrival of a received quantum particle. In some embodiments, the quantum communication receiver 108 may be provided access to the position characteristics (e.g., spatial location, time of arrival) of the state of one or more transmitted quantum particles. In some embodiments, the quantum communication receiver 108 may be provided access by transmission using the communication network 104, or similar network interface. In some embodiments, the quantum communication receiver 108 may be provided access to a common repository to which the quantum communication transmitter 106 may save position characteristics of the state of transmitted quantum particles. In some embodiments, the quantum communication receiver 108 may reflect or retransmit received quantum particles back to the quantum communication transmitter 106 and the quantum communication transmitter 106 may perform the step of comparing the position of the received quantum particle with the position of the transmitted quantum particle.

With access to the state characteristics related to the position of the transmitted quantum particle a quantum communication receiver 108 may, in some embodiments, compare the position of the received quantum particle with the position of the transmitted quantum particle. In some embodiments, the quantum communication receiver 108 may compare the spatial location of a received quantum particle with the spatial location of the transmitted quantum particle and determine an overall displacement. For example, the quantum communication receiver 108 may determine an x,y location of a received quantum particle in the cross-section of the transmitting medium and determine the displacement as compared with the cross-sectional location of the transmitted quantum particle. In some embodiments, the quantum communication receiver 108 may compare the time of arrival of a received quantum particle with a time of transmittal (e.g., the time a quantum particle was transmitted from the quantum communication transmitter 106) and determine a travel time of the quantum particle. In some embodiments, the quantum communication receiver 108 (or quantum communication transmitter 106) may compare the determined travel time with an expected travel time. In some embodiments, the projected travel time quantum communication receiver 108 may be pre-determined based on the physical characteristics of the quantum communication network 100. In some embodiments, the projected travel time may be determined based on recorded travel times of transmitted quantum particles. In some embodiments, the quantum communication receiver 108 may compare the recorded travel time with the expected travel time to identify shifts or anomalies in the observed travel time of a quantum particle or group of quantum particles. Additionally or alternatively, the wave packets encoding a bit in a single photon may accumulate a temporal relative phase that could be inferred using interference experiment (e.g., equipment associated with the quantum communication transmitter 106) after a subset of photons are reflected back to the quantum communication transmitter 106.

Similar to FIG. 3, as shown in blocks 512 and 514, the method of FIG. 5 may also include detecting the condition of the quantum communication link 102 based on the comparison of the received state to the transmitted state and detecting an eavesdropper accessing the quantum communication link 102 based on the comparison of the received state to the transmitted state. Detecting a change in the spatial location and/or the travel time of a quantum particle or group of quantum particles may be indicative of a quantum channel eavesdropper 110 utilizing measuring devices in an attempt to determine the state information of transmitted quantum particles. For example, an unexpected change in the spatial location of the transmitted quantum particles or group of quantum particles may be indicative of a third party (e.g., the quantum channel eavesdropper 110) measuring the transmitted quantum particles. As another example, an unexpected delay in the transmit time may be caused by a third party (e.g., the quantum channel eavesdropper 110) measuring the transmitted quantum particles. Such changes in position of a transmitted quantum particles or group of particles may indicate the quantum channel eavesdropper 110 is performing measurements or another anomaly in the condition of the quantum communication link 102, even if the encoded values of the transmitted quantum particles are not changed.

FIG. 6 illustrates a change in the spatial location of a transmitted quantum particle caused by a device performing a weak measurement, in accordance with an example embodiment of the present disclosure. As shown in FIG. 6, the quantum channel eavesdropper 110 or other quantum communication device may utilize a quantum measuring device 602 to perform weak measurements on a transmitted quantum data ray 604. The path of the transmitted quantum data ray 604 if unaltered is represented by ordinary ray 606. However, a quantum measuring device 602 may diffract or otherwise alter the path of the transmitted quantum data ray 604, as represented by extraordinary ray 608. The transmission particle displacement 610 may be measured by a quantum communication receiver 108 and may be indicative of a weak measurement being performed.

In some embodiments, the quantum channel eavesdropper 110 may utilize the quantum measuring device 602 (e.g., a birefringent crystal) to make weak measurements. Allowing the transmitted quantum data ray 604 to pass through the quantum measuring device 602, the quantum channel eavesdropper 110 may be able to determine certain state characteristics of a transmitted quantum data ray 604, for example, characteristics related to the transmitted quantum data ray's 604 polarization in a certain basis, while rarely collapsing the polarization of the transmitted quantum particles. A measurement utilizing a quantum measuring device 602, such as a birefringent crystal, may generate the extraordinary ray 608 and a transmission particle displacement 610. In some embodiments, the quantum communication receiver 108 may measure the transmission particle displacement 610 resulting from the use of the quantum measuring device 602. In an instance in which the quantum communication receiver 108 determines the transmission particle displacement 610 is not due to noise or some other condition of the quantum communication link 102, the quantum communication receiver 108 may determine the transmission particle displacement 610 is the result of a third party (e.g., quantum channel eavesdropper 110) performing measurements on the transmitted quantum data ray 604. In such an instance, the quantum communication receiver 108 may determine that a quantum channel eavesdropper 110 is likely intercepting the transmitted data and performing weak measurements.

Many modifications and other embodiments will come to mind to one skilled in the art to which this disclosure pertains having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A quantum communication method comprising:

determining a received state of a qubit received via a quantum communication link, wherein the received state of the qubit comprises one or more properties of the received qubit;

accessing a transmitted state of the qubit, wherein the transmitted state of the qubit comprises one or more properties of the qubit as transmitted;

comparing the one or more properties of the received qubit with the one or more properties of the qubit as transmitted;

determining a first spatial location associated with the received state of the qubit;

accessing a second spatial location associated with the transmitted state of the qubit;

determining a displacement between the first spatial location and the second spatial location; and detecting a condition of the quantum communication link based on the displacement between the first spatial location and the second spatial location.

2. The method according to claim 1, further comprising detecting an eavesdropper device accessing the quantum communication link based on the comparison between the one or more properties of the received qubit and the one or more properties of the qubit as transmitted.

3. The method according to claim 2, wherein the eavesdropper device accessing the quantum communication link utilizes weak measurements.

4. The method according to claim 1, wherein:

the one or more properties of the received qubit comprise at least a position associated with the received qubit, and the one or more properties of the qubit as transmitted comprise at least a position associated with the qubit as transmitted, wherein detecting the condition of the quantum communication link further comprises:

measuring the position associated with the received qubit; and comparing the position associated with the received qubit with the position associated with the qubit as transmitted.

5. The method according to claim 4, wherein measuring the position associated with the received qubit comprises measuring the first spatial location associated with the received state of the qubit.

6. The method according to claim 5, wherein the first spatial location associated with the received state of the qubit is measured via an imaging device.

7. The method according to claim 1, further comprising determining a received encoded value based at least in part on the one or more properties of the received qubit, wherein the received encoded value is communicated by the transmission of a single photon.

8. The method according to claim 5, wherein measuring the position associated with the received qubit comprises measuring a time of arrival of the received qubit.

9. The method according to claim 8, wherein detecting the condition of the quantum communication link further comprises:

accessing a time of transmittal associated with the qubit as transmitted;

determining a travel time between the time of transmittal associated with the qubit as transmitted qubit and the time of arrival of the received qubit; and detecting the condition of the quantum communication link based on the travel time.

10. The method according to claim 1, wherein a plurality of qubits are received, and each qubit of the plurality of qubits comprises a single photon of an entangled pair.

11. The method according to claim 10, further comprising:

transmitting a subset of the received plurality of qubits to a transmit module associated with the transmitted state of the qubit.

12. The method according to claim 1, wherein a plurality of qubits are received, each of the plurality of received qubits having a transmitted encoded value according to a transmitted basis vector, the method further comprising:

determining, for each of the plurality of received qubits, a corresponding received encoded value based at least in part on one or more corresponding properties of the received qubit of the plurality;

comparing, for a subset of the plurality of received qubits, the received encoded value with the transmitted encoded value; and detecting the condition of the quantum communication link based on the comparison, for the subset of the plurality of received qubits, of the received encoded value and the transmitted encoded value, wherein the subset of the plurality of received qubits comprises received encoded values corresponding to a basis vector that matches the transmitted basis vector and wherein the subset of the plurality of received qubits further comprises received encoded values corresponding to a basis vector that fails to match the transmitted basis vector.

13. The method according to claim 1, wherein the first spatial location associated with the received state of the qubit comprises a physical position of the qubit in the cross-section of a transmitting medium.

14. A computer program product for quantum communications, the computer program product comprising at least one non-transitory computer-readable storage medium storing program instructions that, when executed, cause the computer program product to:

determine a received state of a qubit received via a quantum communication link, wherein the received state of the qubit comprises one or more properties of the received qubit;

access a transmitted state of the qubit, wherein the transmitted state of the qubit comprises one or more properties of the qubit as transmitted;

compare the one or more properties of the received qubit with the one or more properties of the qubit as transmitted;

determine a first spatial location associated with the received state of the qubit;

access a second spatial location associated with the transmitted state of the qubit;

determine a displacement between the first spatial location and the second spatial location; and detect a condition of the quantum communication link based on the displacement between the first spatial location and the second spatial location.

15. The computer program product according to claim 14, further comprising program instructions that, when executed, cause the computer program product to detect an eavesdropper device accessing the quantum communication link based on the comparison between the one or more properties of the received qubit and the one or more properties of the qubit as transmitted.

16. The computer program product according to claim 15, wherein the eavesdropper device accessing the quantum communication link utilizes weak measurements.

17. The computer program product according to claim 14, wherein:

the one or more properties of the received qubit comprise at least a position associated with the received qubit, and the one or more properties of the qubit as transmitted comprise at least a position associated with the qubit as transmitted, the computer program product further comprising program instructions that, when executed, cause the computer program product to detect the condition of the quantum communication link by:

measuring the position associated with the received qubit; and comparing the position associated with the received qubit with the position associated with the qubit as transmitted.

18. The computer program product according to claim 17, further comprising program instructions that, when executed, cause the computer program product to measure the position associated with the received qubit by measuring the first spatial location associated with the received state of the qubit.

19. The computer program product according to claim 18, wherein the first spatial location associated with the received state of the qubit is measured using an imaging device.

20. The computer program product according to claim 14, further comprising program instructions that, when executed, cause the computer program product to:

determine a received encoded value based at least in part on the one or more properties of the received qubit, wherein the received encoded value is communicated by the transmission of a single photon.

21. The computer program product according to claim 17, further comprising program instructions that, when executed, cause the computer program product to:

measure the position associated with the received qubit by measuring a time of arrival of the received qubit.

22. The computer program product according to claim 21, further comprising program instructions that, when executed, cause the computer program product to detect the condition of the quantum communication link by:

determining the time of arrival of the received state of the qubit;

accessing a time of transmittal associated with the qubit as transmitted;

determining a travel time between the time of transmittal associated with the qubit as transmitted and the time of arrival of the received qubit; and detecting the condition of the quantum communication link based on the travel time.

23. The computer program product according to claim 14, wherein a plurality of qubits are received, and each qubit of the plurality of qubits comprises a single photon of an entangled pair.

24. The computer program product according to claim 23, further comprising program instructions that, when executed, cause the computer program product to transmit a subset of the received plurality of qubits to a transmit module associated with the transmitted state of the qubit.

25. The computer program product according to claim 14, wherein a plurality of qubits are received, each of the plurality of received qubits having a transmitted encoded value according to a transmitted basis vector, the computer program product further comprising program instructions that, when executed, cause the computer program product to:

determine, for each of the plurality of received qubits, a corresponding received encoded value based at least in part on one or more properties of the received qubit of the plurality;

compare, for a subset of the plurality of received qubits, the received encoded value with the transmitted encoded value; and detect a condition of the quantum communication link based on the comparison, for the subset of the plurality of received qubits, of the received encoded value and the transmitted encoded value, wherein the subset of the plurality of received qubits comprises received encoded values corresponding to a basis vector that matches the transmitted basis vector and wherein the subset of the plurality of received qubits further comprises received encoded values corresponding to a basis vector that fails to match the transmitted basis vector.

26. The computer program product according to claim 14, wherein the first spatial location associated with the received state of the qubit comprises a physical position of the qubit in the cross-section of a transmitting medium.

* * * * *